W. P. KUBITZ & C. SCHMIDBORN.
SPEED ADJUSTER FOR MOTION PICTURE MACHINES.
APPLICATION FILED JULY 29, 1913.
1,128,460.
Patented Feb. 16, 1915.
2 SHEETS—SHEET 1.
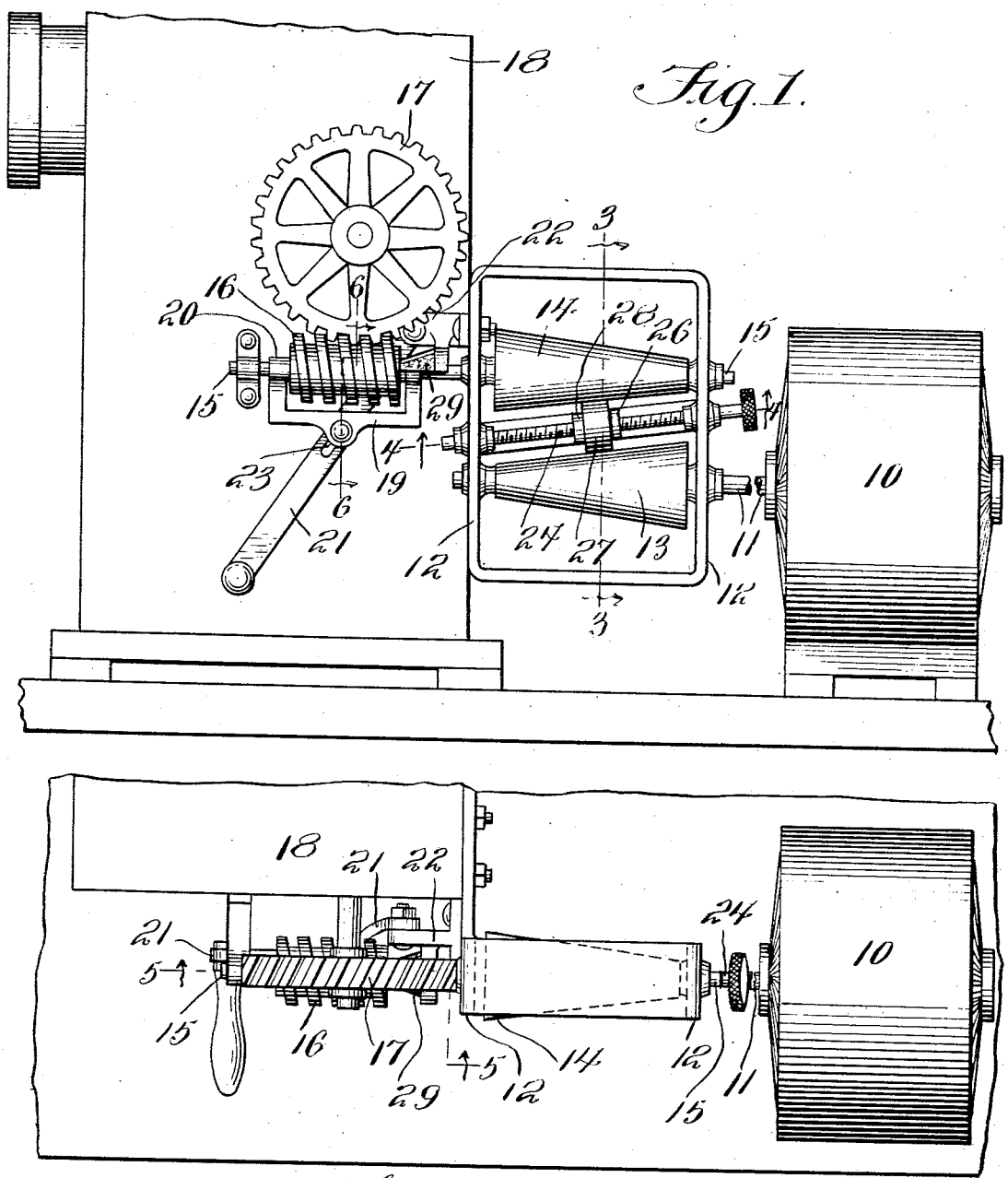

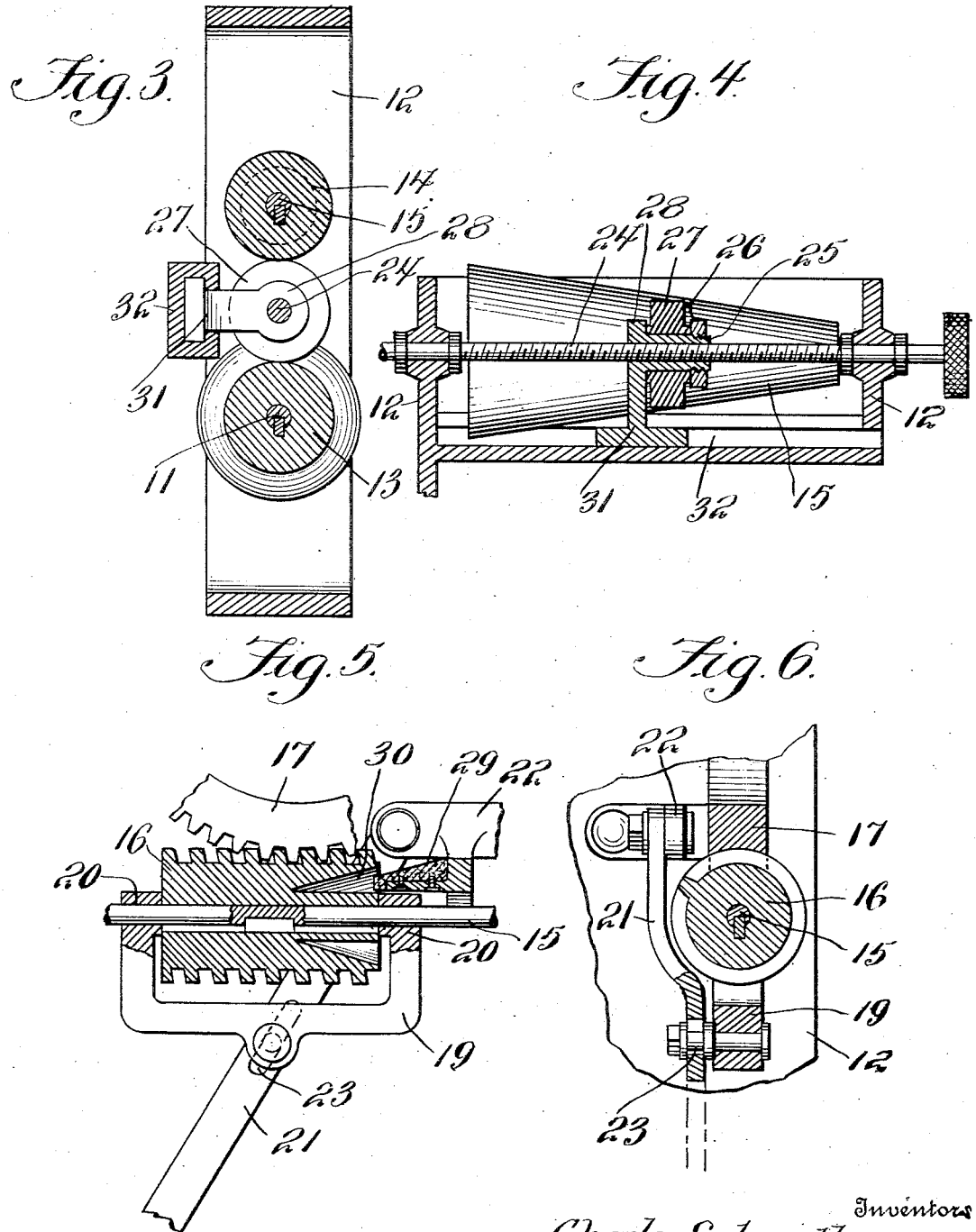

UNITED STATES PATENT OFFICE.

WILLIAM P. KUBITZ AND CHARLES SCHMIDBORN, OF ST. LOUIS, MISSOURI; SAID KUBITZ ASSIGNOR TO SAID SCHMIDBORN.

SPEED-ADJUSTER FOR MOTION-PICTURE MACHINES.

1,128,460.   Specification of Letters Patent.   Patented Feb. 16, 1915.

Application filed July 29, 1913. Serial No. 781,878.

*To all whom it may concern:*

Be it known that we, WILLIAM PHILIP KUBITZ and CHARLES SCHMIDBORN, citizens of the United States, residing at St. Louis, in the State of Missouri, have invented new and useful Improvements in Speed-Adjusters for Motion-Picture Machines, of which the following is a specification.

The invention relates to motion picture apparatus, and has for an object to provide a device for adjusting or controlling the speed of motion picture machines.

The invention comprehends, among other features, the provision of a simple and efficient device whereby the speed of motion picture machines can be so regulated and controlled as to govern the advancement of the film as it passes through the machine and whereby, when desirable, the motion picture apparatus can be brought to a stationary position without, however, interfering with the main drive or motor by means of which a motion picture machine is normally operated.

In the further disclosure of the invention reference is to be had to the accompanying drawings, constituting a part of this specification, in which similar characters of reference denote corresponding parts in all the views, and in which:

Figure 1 is a side elevation of our device; Fig. 2 is a plan view; Fig. 3 is a vertical transverse sectional view taken on the line 3—3 in Fig. 1; Fig. 4 is a fragmentary vertical sectional view taken on the line 4—4 in Fig. 1; Fig. 5 is a fragmentary vertical longitudinal sectional view taken on the line 5—5 in Fig. 2; and Fig. 6 is a vertical transverse sectional view taken on the line 6—6 in Fig. 1.

Referring more particularly to the views, we disclose a motor 10 having a main driving shaft 11 journaled in uprights 12, between which is arranged a cone pulley 13 carried on the shaft 11, a similar but reversed cone pulley 14 being interposed between the uprights 12 and carried on a shaft 15 journaled in the uprights. Keyed against rotation on the shaft 15 and slidable longitudinally on the shaft is a worm member 16 meshing with a worm gear 17 having connection with a motion picture machine 18 and through the medium of which the speed of the motion picture machine will be controlled. A U-shaped member 19 is journaled on the shaft 15 and the worm member 16 is interposed between its ends, with journal boxes 20 of the member 19 abutting against the ends of the worm member 16 so that when the member 19 is actuated the worm member 16 can be moved longitudinally on the shaft without, however, preventing its rotation with the shaft, as will be readily understood by referring to the views. For the purpose of actuating the member 19 a lever 21 has pivotal connection with a bracket 22 projecting from one of the uprights 12 and the said lever 21 has a pin and slot connection 23 with the member 19.

In order to transmit motion from the cone pulley 13 to the cone pulley 14 a threaded spindle 24 is journaled on the uprights 12 to lie between the uprights and between the cone pulleys 13 and 14. A thimble 25 is threaded on the spindle 24 and carries a nut 26, a wheel 27 being arranged to rotate on the thimble 25 and held thereon by a flange 28 at one end of the thimble and the nut 26 at the other end thereof, with the said wheel 27 operating over the surfaces of the cone pulleys 13 and 14 so that when the cone pulley 13 is rotated, rotation will be imparted to the cone pulley 14. Now it will be understood that the spindle 24 is normally stationary, and, if it is desired to adjust the position of the wheel 27 with respect to the cone pulleys 13 and 14 to result in an increase or decrease of speed of the cone pulley 14, it will be apparent that this can be accomplished by turning the spindle 24, thus advancing or retreating the thimble 25 on the spindle to change the position of the wheel with respect to the cone pulleys. A semi-circular brake member 29 preferably formed of fiber or the like has rigid connection with the bracket 22 and projects therefrom, with the said brake member lying adjacent to the worm member 16 and normally spaced therefrom. The worm member is provided at one end with a circular tapering recess 30, into which the brake member 29 is adapted to extend and frictionally engage the walls of the recess when the worm member 16 is moved toward the brake member by means of the lever 21. Now it will be apparent that when the device is in operation, if it is desired to reduce the speed of the gear 17, thus reducing the speed of a motion picture machine 18, a pull is exerted on the lever 21 to move the worm member 16 into engagement with the brake member 29, thus resulting in the brake member exerting a frictional braking action upon the worm member and therefore reducing the speed of rotation of the shaft 15.

In order to properly secure the wheel 27 in any desired position and prevent accidental advancement of the wheel upon the spindle 24, a foot 31 projects from the thimble 25 and is adapted to operate in a guideway 32 so that when the wheel 27 is rotated through the medium of the cone pulley 13 the spindle 25 will be prevented from accidental advancement along the spindle 24.

It will be understood that we do not limit ourselves to the particular construction disclosed therein; that various departures may be made from the construction disclosed without departing from the spirit of the invention and that the scope of the invention is defined by the appended claims.

Having thus described our invention, we claim:

1. In a speed adjuster for motion picture machines, the combination with a shaft, of a worm member mounted to slide and to turn thereon, a worm gear meshing with the worm member and having connection with the motion picture machine, means for imparting rotation to the said shaft, a U-shaped member mounted to slide on the shaft and having the worm member lying between its ends, a lever having connection with the said member for actuating the same on the shaft to advance or retreat the worm member on the shaft, and a brake member adapted to be engaged by the worm member to exert a braking action thereon.

2. In a speed adjuster for motion picture machines, the combination with a shaft, of means for imparting rotation thereto, a worm member mounted to turn and to slide on the shaft, a U-shaped member mounted to slide on the shaft and engaging the worm member to advance or retreat the same on the shaft, a lever for actuating the said member and having a pin and slot connection therewith, and a brake member adapted to be received in a recess formed in the worm member to exert a braking action on the worm member.

In testimony whereof we affix our signatures in presence of two witnesses.

WILL P. KUBITZ.
CHARLES SCHMIDBORN.

Witnesses:
WILLIAM C. PERKINS,
JOSEPH M. CHISWELL.